United States Patent Office 2,946,823
Patented July 26, 1960

2,946,823
PROCESS FOR MAKING METHYL-(4-ISOPROPYL-1-CYCLOPENTYL)-KETONE AND INTERMEDIATE OBTAINED THEREBY

Habib-Emile Eschinazi, Montclair, N.J., assignor to The Givaudan Corporation, New York, N.Y., a corporation of New Jersey No Drawing. Filed Apr. 28, 1958, Ser. No. 731,145

4 Claims. (Cl. 260—593)

This invention relates to a process for making α-oxygenated derivatives of 1-ethyl-isopropylcyclopentenes and 1-ethyl-isopropylcyclopentanes and to novel substances made thereby.

Some α-oxygenated derivatives of 1-ethyl-isopropylcyclopentanes have been described. However, the methods employed in making such products leave much to be desired. Such methods employ elaborate starting materials such as pernitrosocamphor or derivatives of malonic acid. In the case of the former, moreover, degradation by sulfuric acid is involved and the process is not commercially feasible because of technical difficulties and poor yields. The use of malonic acid derivatives is disadvantageous because, among other reasons, decarboxylation is required.

I have succeeded in providing a commercially feasible, technically simple process for making α-oxygenated derivatives of 1-ethylisopropylcyclopentanes by subjecting menthene to ozonolysis so as to form a keto aldehyde and causing this latter substance to cyclize so as to form a methyl cyclopentenyl ketone derivative.

The menthene may be used in the process of this invention in the inactive as well as the $d$ or $l$ forms.

The conditions of the ozonolysis reaction may be varied within wide limits. Temperatures within the range from about −70° C. to about 50° C. may be used, temperatures within the range from about 0° C. to about 25° C. giving especially advantageous results.

The ozonolysis reaction is instantaneous. Practical considerations governing the rate of introduction of the ozonizing agent dictate the amount of time required for completion of the reaction.

The resulting ozonide is decomposed to a keto aldehyde by means of chemical reducing agents, such as powdered metallic zinc, or sulfites, or by catalytic hydrogenation. The temperature at which decomposition is effected varies, being from about 0° C. to about 100° C., and, preferably, between about 70° C. and about 80° C.

The formed keto aldehyde is 3-isopropyl-6-oxoheptanal. It may be cyclized to form methyl-(4-isopropyl-1-cyclopentenyl) ketone. It has infrared spectrographic bands at 5.85 (double), 6.85, 7.1, 7.25, 7.35 and 8.5 microns.

In cyclizing the aforementioned keto aldehyde it is treated either with aqueous alkali or with acids at a temperature varying between 0° C. and 100° C., for about 1 to 2 hours; advantageously, this operation may be conducted at a temperature within the range from about 80° C. to about 100° C.

The resulting product is methyl-(4-isopropyl-1-cyclopentenyl) ketone.

The reactions occurring during the carrying out of the present process may be represented schematically as follows, using d-l-p-menthene as the starting material:

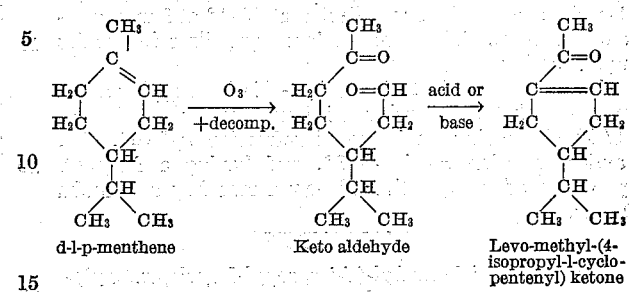

d-l-p-menthene      Keto aldehyde      Levo-methyl-(4-isopropyl-l-cyclopentenyl) ketone The novel methyl-(4-isopropyl-cyclopentenyl) ketone of this invention may be used to prepare other products having desirable olfactory characteristics. For example, it may be hydrogenated to form 1-(3-isopropyl-cyclopentyl)-1-ethanol, which in turn may be acetylated to form the novel 1-(3-isopropylcyclopentyl) 1-ethyl acetate. If desired, the novel methyl-(4-isopropyl-1-cyclopentenyl) ketone may be hydrogenated to form the unsaturated alcohol, 1-(4-isopropyl-1-cyclopentenyl)ethanol; or it may be hydrogenated to form the unsaturated ketone, methyl-(3-isopropyl-1-cyclopentyl) ketone.

The following examples illustrate the invention without, however, limiting it thereto. All temperatures are in degrees centigrade. All parts are by weight unless otherwise specifically stated.

EXAMLE I

Preparation of levo-3-isopropyl 6-oxoheptanal

A solution of 205 g. of d-l-p-menthene in 205 g. of acetic acid is ozonized with a stream of oxygen, containing approximately 70–75 mg. of ozone per liter, between 10–15° until the ozone is absorbed no more.

The ozonide is then mixed with 750 ml. of water in a 3 liter flask and 80 g. of powdered zinc are added within 15–20 minutes under strong agitation while the temperature is maintained around 30–35° by means of a slight cooling. The top layer is separated and the bottom layer is extracted with 100 ml. of benzene. The combined organic layers are washed with water, then with 100 ml. of 20% aqueous caustic soda solution to extract a small amount of 3-isopropyl 6-oxoheptanoic acid; and the benzene layer is washed again with a saturated sodium chloride solution. After evaporation of the benzene, the levo-3-isopropyl 6-oxoheptanal is distilled under vacuum and the bulk passes at 90–105° at a pressure of 3 mm. of mercury. The total distillate is about 150–160 g. The keto aldehyde upon treatment with sodium bisulfite gives a crystalline bisulfite which can be dissolved in hot water and decomposed with soda ash to yield the pure levo-3-isopropyl 6-oxoheptanal:

B.P. 3/mm.—98–100
$n_D 1.4515 \alpha_D -6°$
Infrared absorption bands: 5.85 (double) 6.85, 7.1, 7.25, 7.35, 8.6 microns.

By oximation it shows a carbonyl value of 680 for a theoretical value of 690 calculated for the pure keto aldehyde.

EXAMPLE II

*Preparation of levo methyl-(4-isopropyl-1-cyclopentenyl)-ketone*

One hundred grams (100 g.) of levo 3-isopropyl 6-oxoheptanal were added to 1 g. of p-toluenesulfonic acid dissolved in 100 ml. of benzene in a 500 ml. flask provided with a Dean-Starke trap and a reflux condenser. After about 1 hour heating under reflux a total of approximately 9.5 ml. of water collected in the trap. The reaction mixture was cooled, washed with a 10% aqueous caustic soda solution and the solvent was evaporated. Upon distillation about 75 g. of levo-methyl-(4-isopropyl-1-cyclopentenyl)-ketone collected at 80-1° at 3 mm. mercury pressure. The pure product crystallizes in needles upon cooling.

The final product 1 - methyl - (4 - isopropyl-1-cyclopentenyl)-ketone, consists of long needles melting at 17.5° C., having an index of refraction $n_D^{20}=1.4720$, optical rotation $\alpha_D$ is $-18°$, and having a fragrant, powerful odor suggestive of new mown hay and tonka beans.

EXAMPLE III

*Preparation of L-methyl-(4-isopropyl-1-cyclopentenyl)-ketone*

The crude benzene solution obtained in Example 1 from the ozonization of 205 g. of d-l-p-menthene was placed in a 3 liter flask provided with a stirrer and a reflux condenser and containing 750 ml. of 10% aqueous sulfuric acid. The mixture was heated and stirred under reflux for half an hour. Then the benzene and the newly formed ketone were collected while the water was continuously fed back in the flask. At the end of the distillation the benzene distillate was dried and the solvent evaporated. The residue was then distilled in vacuum. After a small light boiling cut, ca. 15-25 g., the levo-methyl (4-isopropyl-1-cyclopentenyl) ketone distilled at 74-75° at 2.5 mm. and crystallizes upon cooling in long needles m. 17.5° $n_D^{20}$ 1.4720, $\alpha_D$ is $-18°$. The yield was 130-145 g.

EXAMPLE IV

*Preparation of L-1-(3-isopropylcyclopentyl)-1-ethanol*

Two hundred grams (200 g.) of the levo-methyl (4-isopropyl-1-cyclopentenyl) ketone was introduced in a 1½ liter steel rocking autoclave together with 20 g. of copper-chromite catalyst. The air was evacuated from the autoclave and hydrogen gas was introduced until a pressure of 400 p.s.i. was obtained. Agitation was begun and heat was applied until the temperature reached 150° C., whereupon hydrogen was absorbed as evidenced by a drop of pressure. Additional hydrogen was added to maintain the pressure between 250-400 p.s.i. A total of 5-5.5 g. of hydrogen was absorbed, usually in the course of about 3 hours. After cooling and filtration from the catalyst, the crude alcohol weighing approximately 205 g. was distilled to yield the levo 1-(3-isopropylcyclopentyl)-1-ethanol which boiled at 69° at 2 mm. mercury pressure. Its $n_D^{20}$ was 1.4568 and its $\alpha_D^{25}$ was $-8°$. It is a colorless viscous oil with a very fragrant flowery note suggesting lily of the valley.

EXAMPLE V

*Preparation of levo-1-(3-isopropylcyclopentyl)-1-ethyl acetate*

Two hundred grams (200 g.) of levo-(3-isopropylcyclopentyl) 1-ethanol, 250 ml. acetic anhydride and 2 g. of sodium acetate were heated to reflux for 2 hours. After cooling, the excess of acetic anhydride was decomposed with 500 ml. of water and the reaction product was separated. The bottom layer was extracted with benzene and the extract together with the organic layer was neutralized with 10% aqueous soda ash solution. The product which was recovered after evaporation of the solvent is the levo-1-(3-isopropylcyclopentyl)-1-ethyl acetate. It has a pleasant linalyl acetate bergamot-like odor, B.P. 3 mm./82°, $n_D^{20}$ 1.4407, $\alpha_D$ is $-6°30'$.

EXAMPLE VI

*Preparation of 1-(4-isopropyl-1-cyclopentenyl)-1-ethanol*

Two hundred grams (200 g.) of methyl (4-isopropyl-1-cyclopentenyl) ketone in 400 ml. of ether were slowly introduced into an agitated mixture of 15 g. LiAlH$_4$ in 700 ml. dry ether within 20-30 minutes. The mixture was stirred for an additional hour, then carefully decomposed by the addition of 5-10 ml. of ethyl acetate, then 10-15 ml. of water. The ether layer was then decanted from the aluminum hydroxide gel and evaporated. Upon distillation the 1-(4-isopropyl-1-cyclopentenyl)-1-ethanol was recovered by distillation. It had a B.P. 3 mm./70°, $n_D^{20}$ 1.4670, $\alpha_D$ is $-3°$, and its odor had a terpineol minty note.

EXAMPLE VII

*Preparation of methyl (3-isopropylcyclopentyl) ketone*

Two hundred grams (200 g.) of methyl (4-isopropyl-1-cyclopentenyl) ketone were introduced into a 1.5 liter steel rocking autoclave together with 2 g. of 5% palladium on carbon catalyst. The air was evacuated and replaced with hydrogen at 250 p.s.i. pressure. Agitation was begun and the temperature was brought to around 60-80°, whereupon hydrogen was slowly absorbed and the pressure was maintained between 200-250 p.s.i. After about 2 hours a total of 2.6 g. of hydrogen was absorbed. The reaction mixture was then cooled and filtered from the catalyst and the pure methyl (3-isopropylcyclopentyl) ketone boiled at 56° at a pressure of 3 mm. of Hg, its $n_D^{20}$ was 1.4471, its $\alpha_D$ was 3°, and it had a rosy odor which, upon dilution, recalls that of the orange blossoms.

EXAMPLE VIII

Each of the compounds disclosed above was incorporated in soap cakes by the following procedure:

One hundred grams of white unperfumed soap stock, made by completely saponifying a mixture of about 80 parts by weight of inedible beef tallow and about 20 parts by weight of coconut oil with sodium hydroxide and removing unreacted glycerides and alkali, e.g., the soap designated as Maxine, by Swift & Co., was milled in a porcelain mortar until it was reduced to a fine powder. One gram of the compound to be tested was added to the soap which was again milled until the soap and perfuming agent were intimately mixed. Ten grams of distilled water was added and the mixture was again milled to a homogeneous plastic mass. Twenty grams of this mixture was placed in a cylindrical stainless steel tableting die and pressed in a hand arbor press to produce a soap cake 3.7 cm. in diameter and 2.0 cm. thick.

The soap cakes thus produced containing each of the compounds had pleasant and stable characteristic odors and remained white over two month's examination.

EXAMPLE IX

Cleansing creams scented with each of the compounds disclosed above were prepared as follows:

Portion A: Grams

| | |
|---|---|
| Beeswax | 13 |
| Mineral oil | 46 |
| | 59 |

Portion B: Grams

| | |
|---|---|
| Borax | 1.0 |
| Water | 39.5 |
| | 40.5 |

The ingredients of portion A were melted together and portion B was then added slowly. The mixture was then agitated while being allowed to cool to 50° C. One half gram of the novel perfume material was added and the cream was agitated once more until the perfume material was completely dispersed in the cream. The creams containing each of the compounds had pleasant and stable characteristic odors and did not become discolored.

EXAMPLE X

The novel odoriferously pure compound 1-(3-isopropylcyclopentyl)-1-ethanol is shown to be a useful and in fact desirable perfume ingredient of the general flowery type. It would be useful, in the same way that naturally derived linalool, citronellol and geraniol are useful in compounding odors of rose, jasmin, lilac, maguet and other floral types. The use of 1-(3-isopropylcyclopentyl)-1-ethanol is particularly desirable in that it lends to compositions made largely of synthetic materials a certain naturalness of fragrance which is difficult if not impossible to obtain without the liberal use of natural perfume materials. The following formula is an example of a rose perfume made almost completely from synthetically derived materials of which 1-(3-isopropylcyclopentyl)-1-ethanol is used as a major ingredient.

Rose:
| | |
|---|---:|
| Phenylethyl alcohol | 366.0 |
| 1-(3-isopropylcyclopentyl) ethanol | 305.0 |
| Terpineol | 24.3 |
| Undecylenic aldehyde, 10% in diethyl phthalate | 12.2 |
| Benzophenone | 36.5 |
| Benzyl acetate | 48.8 |
| Nonyl aldehyde, 10% in diethyl phthalate | 12.2 |
| Methyl diphenyl ether | 61.0 |
| Citronellyl acetate | 61.0 |
| Dimethylbenzylcarbinyl acetate | 24.3 |
| Methylionone | 12.2 |
| Isobutylquinoline, 10% in benzyl benzoate | 12.2 |
| Methyl-(4 - isopropyl - 1 - cyclopentyl) ketone | 24.3 |
| | 1000.0 |

EXAMPLE XI

The following formula is an example of a muguet perfume based upon 1-(3-isopropylcyclopentyl)-1-ethanol.

Muguet:
| | |
|---|---:|
| 1-(3-isopropylcyclopentyl)-1-ethanol | 520.0 |
| Diphenyl methane | 60.0 |
| 4-tert. butyl α-methyl hydrocinnamic aldehyde | 35.0 |
| Benzyl propionate | 175.0 |
| Heliotropin | 46.5 |
| Ionone pure | 11.6 |
| Terpineol extra | 35.0 |
| 1,1,4,4 - tetramethyl-6-ethyl-7-acetyl-1,2,3,4-tetra hydronaphthalene, 10% in diethyl phthalate | 5.8 |
| Dihydrosafrole, 10% in diethyl phthalate | 5.8 |
| Ethyl salicylate, 10% in diethyl phthalate | 5.8 |
| Hydratropic aldehyde dimethyl acetal, 10% in diethyl phthalate | 17.5 |
| Alpha methylcinnamic aldehyde | 23.5 |
| Orris concrete, 10% in diethyl phthalate | 23.5 |
| Isoeugenol | 35.0 |
| | 1000.0 |

This composition, although based almost completely on synthetic materials, was found to have a natural flowery odor. This perfume was incorporated in soap cakes at the rate of 1% using the procedure described above in Example VIII. The cakes were left exposed to daylight and air for a period of three months during which time they were examined organoleptically once a week. The perfume was found to impart a strong flowery fragrance in the soap which remained strong and pleasant for the duration of the test.

EXAMPLE XII

The following formula is an example of a totally synthetic lavender composition using 1-(3-isopropylcyclopentyl)-1-ethyl acetate as the main ingredient.

Lavender:
| | |
|---|---:|
| 1-(3-isopropylcyclopentyl)-1-ethyl acetate | 560.0 |
| Methyl amyl ketone | 45.5 |
| Borneol pure | 22.5 |
| Limonene redistilled | 45.5 |
| Myrcene redistilled | 67.0 |
| Alpha methylcinnamic aldehyde | 113.0 |
| Methyl-(4 - isopropylcyclopentenyl) ketone, 10% in diethyl phthalate | 45.5 |
| Terpineol prime | 45.5 |
| 6-methylcoumarin | 11.0 |
| Allyl caproate, 10% in diethyl phthalate | 11.0 |
| Capryl alcohol | 22.5 |
| 4-ethylphenol, 10% in isoamyl alcohol | 11.0 |
| | 1000.0 |

The foregoing illustrates the practice of my invention, which, however, is not to be limited thereby, but is to be construed as broadly as permissible in view of the prior art and limited solely by the appended claims.

I claim:

1. The process, which comprises subjecting 1-paramenthene to ozone at a temperature within the range from about −70° C. to about 50° C., heating the resulting ozonide under reducing conditions at a temperature within the range from about 0° C. to about 100° C. to form 3-isopropyl-6-oxoheptanal, and heating the latter in the presence of a member selected from the group consisting of aqueous alkali and aqueous acid at a temperature within the range from about 0° C. to about 100° C. to form methyl-(4-isopropyl-1-cyclopentenyl)-ketone.

2. The process, which comprises subjecting 1-paramenthene to ozone at a temperature within the range from about 0° C. to about 25° C., heating the resulting ozonide under reducing conditions at a temperature within the range from about 70° C. to about 80° C. to form 3-isopropyl-6-oxoheptanal, and heating the latter in the presence of a member selected from the group consisting of aqueous alkali and aqueous acid at a temperature within the range from about 80° C. to about 100° C. to form methyl-(4-isopropyl-1-cyclopentenyl)-ketone.

3. The process, which comprises ozonizing d-l-p-menthene with ozone in a stream of oxygen at a temperature from about 10° to about 15° C. until no more ozone is absorbed, decomposing the resulting ozonide with zinc at a temperature from about 30° C. to about 35° C., and condensing the resulting 1-3-isopropyl-6-oxoheptanal in the presence of p-toluenesulfonic acid at a temperature from about 80° C. to about 100° C., whereby 1-methyl-(4-isopropyl-1-cyclopentenyl)-ketone forms.

4. L-3-isopropyl-6-oxoheptanal, having a boiling point of about 98°–100° C. under a pressure of 3 mm. of Hg, $n_D^{20}=1.4515$, $\alpha_D$ is −6°, and infrared absorption bands at 5.85 (double), 6.85, 7.1, 7.25, 7.35 and 8.6 microns.

References Cited in the file of this patent

UNITED STATES PATENTS

| 2,597,843 | Linn | May 27, 1952 |
| 2,624,764 | Emerson et al. | Jan. 6, 1953 |

OTHER REFERENCES

Schmidt Ber. Deut. Chem., vol. 80, pg. 536, (1947).
Ruzicka et al.: Helv. Chim. Acta. vol. 30, pgs. 2173, 2189–90 (1947).